United States Patent [19]

Nelson

[11] Patent Number: 4,679,922
[45] Date of Patent: Jul. 14, 1987

[54] RETRIEVING IMAGES STORED ON WINDOWED DISCS

[76] Inventor: John C. Nelson, 4013 Linden St., Oakland, Calif. 94608

[21] Appl. No.: 637,584

[22] Filed: Aug. 3, 1984

[51] Int. Cl.⁴ .............................................. G03B 23/06
[52] U.S. Cl. ....................................... 353/25; 353/110
[58] Field of Search ................ 353/25, 108, 110, 27 R, 353/27 A

[56] References Cited

U.S. PATENT DOCUMENTS

| | | | |
|---|---|---|---|
| 1,215,975 | 2/1917 | Palmer | 353/110 X |
| 3,421,802 | 1/1969 | Irazoqui | 353/110 X |
| 3,743,400 | 7/1973 | Haning | 353/27 A |
| 4,132,469 | 1/1979 | Harvey | 353/25 |

FOREIGN PATENT DOCUMENTS

| | | | |
|---|---|---|---|
| 1231770 | 4/1960 | France | 353/27 R |
| 0743034 | 6/1980 | U.S.S.R. | 353/27 A |

OTHER PUBLICATIONS

Publication: Microfiche Image Storage Research Disclosure #214, pp. 54 & 55, 2/82.

Primary Examiner—Harry N. Haroian
Attorney, Agent, or Firm—Frank L. Abbott

[57] ABSTRACT

A high-density rapid random-access retrieval apparatus for retrieving micrographic and data images stored on plural windowed discs. The apparatus is comprised of a disc/radial selection mechanism which moves axially on a cartridge containing a stack of closely spaced discs. Each disc has a clear window disposed on a radius thereof and a plurality of windows containing micrographic and/or data images disposed along other radii. When the disc/radial selection mechanism has moved to a selected disc, the radial component rotates the disc until the radius upon which the desired image is located is aligned with the clear windows in the other discs. The optical system includes lens and reflecting surfaces. At one end of the system is a projection means and at the other end lies its image receiving means. Elements of the system are vertically adjustable so that the line of sight of the system is projected through any selected image bearing window. The optical system also includes a means for keeping all of the optical path lengths constant. The constant image-to-lens path length attained maintains the constant position and size of the primary aerial image regardless of the location of the image bearing window on the disc/radius. The distance between the light source and the selected image varies with the position of the disc in the cartridge, which variation changes the cross section of the source cone. In the disclosed system this distance remains constant and the cross section of the source cone remains constant whereby the brightness and eveness of illumination remains constant regardless of the position of the disc in the stack.

34 Claims, 15 Drawing Figures

FIG. 9.
FIG. 10.
FIG. 11.
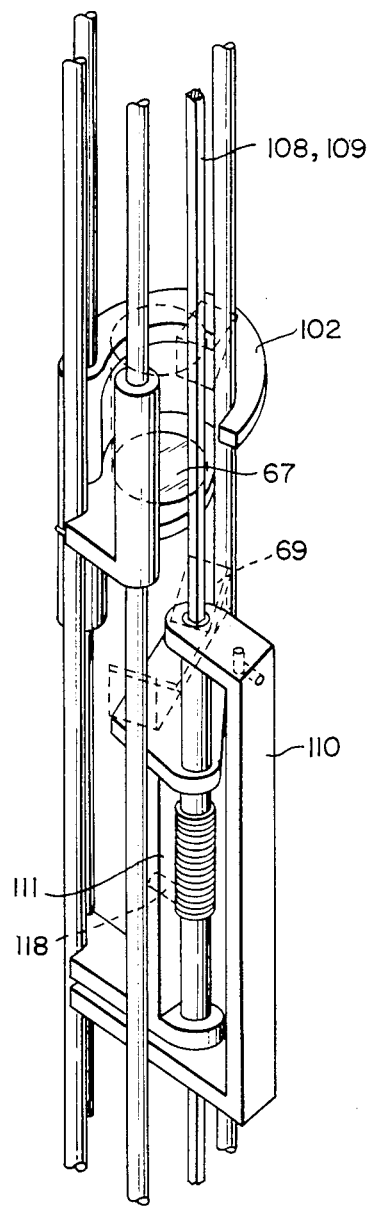
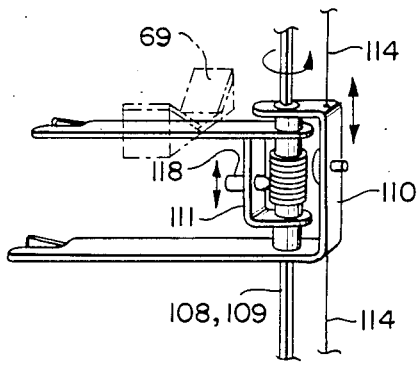
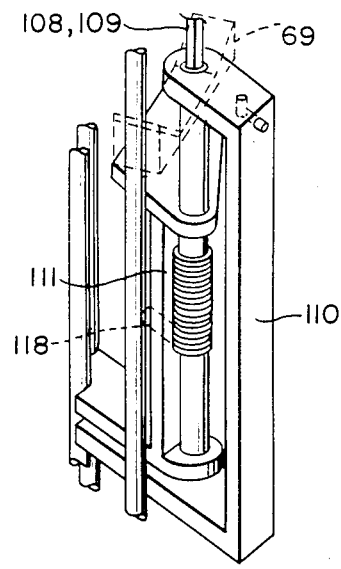

RETRIEVING IMAGES STORED ON WINDOWED DISCS

BACKGROUND OF THE INVENTION

The present invention relates to a novel basic concept for the rapid, random-access retrieval of micrographic and data images stored on plural windowed discs. The concept can be implemented to provide a variety of specific devices.

The term "windowed" disc refers to an optically clear area on each disc that characterizes this type of invention. The essential principle is that aligned windows in plural discs form a viewing column through which the stored information on any single unaligned disc may be seen.

The present invention shares some aspects of the windowed disc concept with prior art. Examples of the prior art are the patents to Braggs et al, U.S. Pat. No. 2,989,904; Irazoqui, U.S. Pat. No. 3,421,802; Booth, U.S. Pat. No. 3,959,801; Harvey, U.S. Pat. No.4,132,469 and Pick, U.S. Pat. No. 3,975,745. However, it differs greatly from the prior art in its general concept and the apparatus for implementing it.

The primary advantage of windowed disc devices over related disc devices regards the amount of space utilized between the discs, which greatly affects the overall storage density of the device. Optical retrieval devices based on the principles of magnetic disk storage devices have no window and consequently must insert read heads between discs (Booth; Pick). Providing each disc with an optically clear window allows discs to be stored proximately.

Prior windowed disc devices may be divided into two groups depending on the function performed by the disc window. In one group, the viewing column formed by the aligned windows is used to allow passage of an optical head from one disc position to another (Braggs; Harvey). In this group, the disc windows must be open at the rim in order to allow lateral insertion of the optical head into the viewing column. In the second group, the viewing column is used to allow passage of the information-reading optical beam only, which is directed from the ends of the viewing column (Irazoqui). In this group, the disc rim at the window location may be closed since no physical components are inserted into the viewing column. The present invention belongs to the latter group.

Four features of the present invention distinguish it from all other prior windowed disc art. First, it provides mechanisms that access discs containing plural concentric levels of images; all prior art windowed discs contain only a single ring of images.

Second, it provides mechanisms that address a plurality of object planes (disc positions) while maintaining a constant aerial image plane, thereby enabling retrieval with no relative motion between the disc stack, the chassis and the primary viewing element (lens, video pickup, change coupled device). Prior art devices either use a single object plane or fail to disclose means for achieving plural object planes.

Third, the present invention provides means for the simultaneous rotation of two or more discs at one time. Prior art devices find and file sequentially. That is, they rotate a selected disc to a selected position (find), then rotate it back to the aligned home position (file), then move to another disc position to find again. The present invention can find on one disc while simultaneously filing the previous disc.

Fourth, the present invention uses perimeter disc support in preferred embodiments, whereas prior art discs are all supported at their centers.

The various prior art devices have additional problems which can be solved or alleviated by the present invention. For example, the present invention can:

record as well as play;

retrieve any image in 100,000 in $\frac{1}{2}$ second;

store more than one type of information on the same storage medium, allowing both eye-readable and machine-readable playback from the same machine;

store multiple media types (black-and-white and color photo emulsions, eraseable laser-ablative optical data disc media) on the same disc or in the same cartridge, allowing retrieval of a wide range of information types from the same machine;

avoid loss of storage area due to peripherally-increasing bit size (as required in constant-velocity disc devices);

avoid loss of storage area due to on-medium servo guidance tracks or spaces (as required by micron bit size optical disc devices);

increase stack volume-density by storing discs contigously (as cited above);

increase stack volume-density by reducing the thickness of the discs using integral constructions of transparent substrates and emulsion rather than the multipiece opaque substrate constructions used by prior art;

facilitate the placement and removal of discs in cartridges;

interface with any type of display or transmission equipment capable of utilizing an aerial image (ocular lens, projection lens, video pickup, CCD facsimile scanner, etc.);

avoid the coding of image location on the image medium (for example, micrographic "blip" coding);

operate under total computer control of its various electromechanical components (computer-driven rather than "computer-assisted-retrieval", CAR);

store unitized volumes of information far beyond the unit capacities of existing equipment (for example, beyond the 80-image limit of carousel slide projections, beyond the 200-foot roll film cartridge capacity of current CAR micrographic systems and beyond the 500 megabyte limit of magnetic disc drives);

access large volumes of information without manual operator intervention (for example, no roll film cartridge swapping, no exchanging of magnetic disc assemblies);

largely avoid "autofocus" adjustments by maintaining precise positioning of all discs at all times; can also use its existing optical adjustment system for autofocus purposes if needed.

These and other advantages of the present invention will become more apparent with consideration of the following description.

SUMMARY OF THE INVENTION

The present invention provides a basic concept for the retrieval of information stored as images on substantially circular plural windowed discs. The images extend along the radii of each disc from the center to the perimeter. Each disc also has a clear window extending along a radius thereof, which aligns with the clear windows of the other discs to form a viewing column through which images on any unaligned disc may been seen.

The discs are removably stored in close proximity to each other in a cartridge. The selected cartridge is received by the chassis and remains stationary relative thereto. (The cartridge structure may also be fixed to and integral with the chassis.)

Selective retrieval of specific images takes place by optical projection from multiple object planes onto a single aerial image plane. (In optical terms, the information images stored on the discs are the objects of the invention's optical system.)

The electromechanical subsystems effect the optical routing of the information from object planes to aerial image plane: a disc/radial selection mechanism and an optical system.

The disc/radial selection mechanism moves axially relative to the cartridge to a position adjacent the selected disc, at which position the radial component becomes effective to rotate the disc to position the radius containing the selected image in alignment with the clear windows of the other discs.

The optical system, consisting of the necessary lens and reflective surfaces, has its projecting means at one end of the stack of discs and its image receiving means at the other end of the stack. The means are vertically adjustable by a system which is actuated to project the line of sight of the optical system through the selected image on the radius. Means are also provided to keep all optical pathlengths constant.

The various mechanisms and combinations set forth in this patent constitute various embodiments of a single novel retrieval concept capable of mass information storage, exceptionally high retrieval speed, and unique versatility in the types of information stored. The concept can be described in its most generalized form as follows: Optically-readable information is stored as densely as possible at discrete locations within a spatial volume. Each location has a unique coordinate identity, x-y-z. Each location can be accessed in its three spatial dimensions simultaneously. By electromechanically setting three distinct positions, x, y and z, a unique optical path is provided to any selected image. The three spatial dimensions of the invention method are called, (1) disc selection (z), (2) radial selection (x), and (3) level selection (y).

Pivotal to this novel concept for image retrieval is the manner in which information is formated. At the present time, standard micrographic image retrieval is practiced using only two formats: linear (roll film) and rectangular matrix (fiche). Matrix format has an obvious advantage in that simultaneous x-y positioning of a ten-by-ten arrangement of images can occur in the time it takes for only ten images in linear format to be moved. That is, the two-dimensional matrix format has an inherent square-root (10:100) retrieval time advantage over linear format. Since the present invention method can access in three dimensions simultaneously, x-y-z, it is clear that information formated radially in multiple concentric levels on windowed discs has an inherent cube-root (10:1,000) retrieval time advantage over linear format, owing intrinsically to the windowed disc format itself. It is therefore believed that the windowed disc format of this invention method will become a standard micrographic format.

BRIEF DESCRIPTION OF THE DRAWINGS

Further objects and advamtages of the invention will become apparent from the following description and claims, and from the accompanying drawings, wherein:

FIGS. 9, 10, 11, 12 and 13 illustrate in more detail the basic optical adjustment system for use within the scope of the invention; FIG. 12 being a part sectional view of FIG. 11;

DESCRIPTION OF PREFERRED EMBODIMENT

FIGS. 1, 2, 3 and 4 schematically illustrate the possible arrangements for supporting a disc and rotating it to a selected radial position. They can be broadly described as center support/center drive, center support/perimeter drive, perimeter support/center drive, and perimeter support/perimeter drive.

Figure 5:
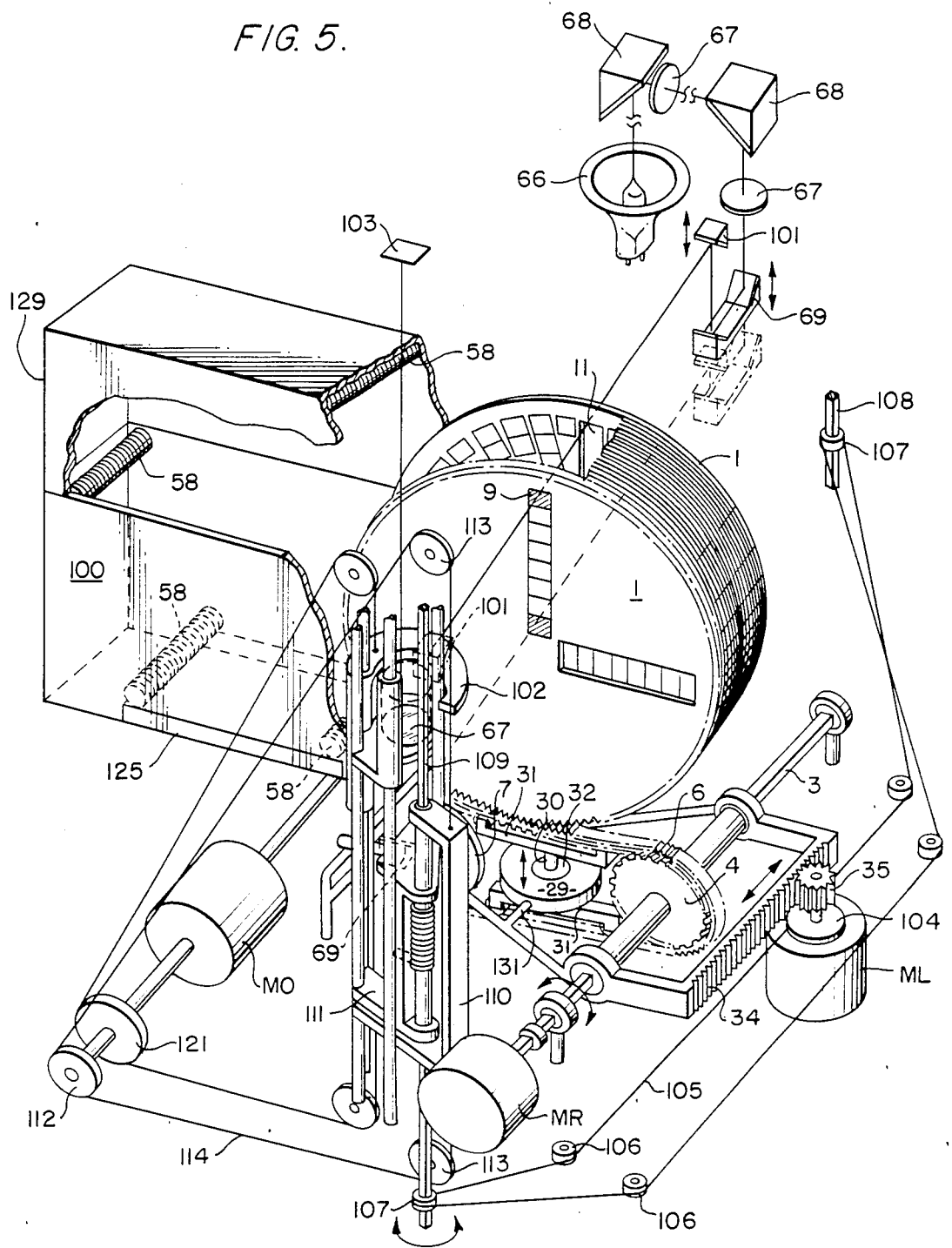
FIG. 5 is a detailed view of a perimeter support/perimeter drive embodiment of the retrieval system.

A preferred embodiment of this invention for many applications is a perimeter support/perimeter drive design, as shown in FIG. 5. However, before describing a preferred embodiment, a brief review of the advantages and disadvantages of each of the four arrangement types is in order.

Figure 1:
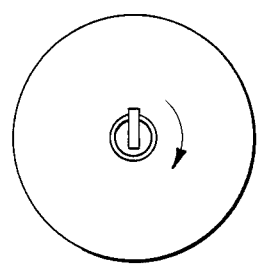
FIG. 1 illustrates schematically a center support, center drive arrangement for rotating the windowed discs.
Figure 2:
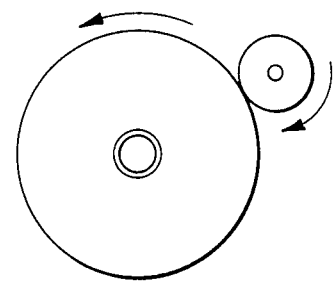
FIG. 2 is similar to FIG. 1 but illustrates a center support, perimeter drive.

Prior art embodiments are of the types shown in FIGS. 1 and 2.

In FIG. 1 a key moves axially within a support tube to engage the various discs for rotation; or, a set of solenoids actuates engagement pins at each disc location, as in Irazoqui's design. The present invention generally avoids this configuration because of difficulties in attaining positional accuracy. Positional errors incurred at the center are magnified at peripheral image positions, particularly on large discs. Other difficulties involve: providing a moving key with clearance from disc keyways while moving an anti-backlash means (to take up the clearance) while rotating a disc; and providing anti-rotation locking for each disc since the -rotating center tube will otherwise cause all discs to rotate. In addition, this arrangement is unsuited for high speed continuous rotation retrieval modes (optional data disc type applications) since such discs should be journaled to a central shaft with antifriction bearings. Nor can it be used to rotate two discs at one time in find-while-file applications.

In FIG. 2 rotational actuation is provided at the perimeter by friction drive pucks (Harvey), sweep arm (Braggs) or other means. Although perimeter drive speeds must be higher in proportion to the radius of the disc as compared with center drives of comparable retrieval time, positional accuracy is easily maintained.

Figure 3:
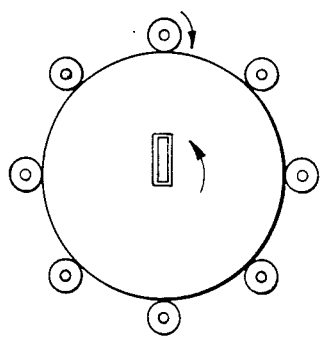
FIG. 3 is illustrative of a perimeter support, center drive.

The main disadvantage of both FIGS. 1 and 2, however, lies in the center support element. Mounting discs into or onto the stack requires a relatively involved procedure. To add a disc to the end of the stack, at least one end of the spindle shaft must be detached from the chassis while maintaining the alignment of all discs. To add a disc to the middle of the stack, half the discs must be removed from the spindle and replaced, again maintaining alignment. In addition, vacancies left at the end of the spindle for future expansion must be compensated in order to maintain the positions of the existing discs. The arrangement in FIG. 3 is also center supported and shares these disadvantages.

Figure 4:
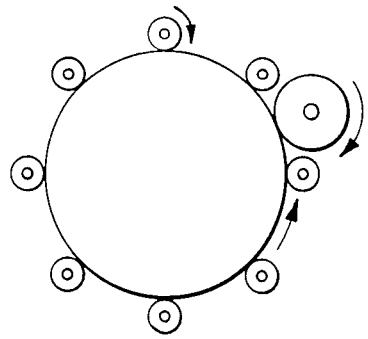
FIG. 4 illustrates a perimeter support, perimeter drive.
Figure 8:
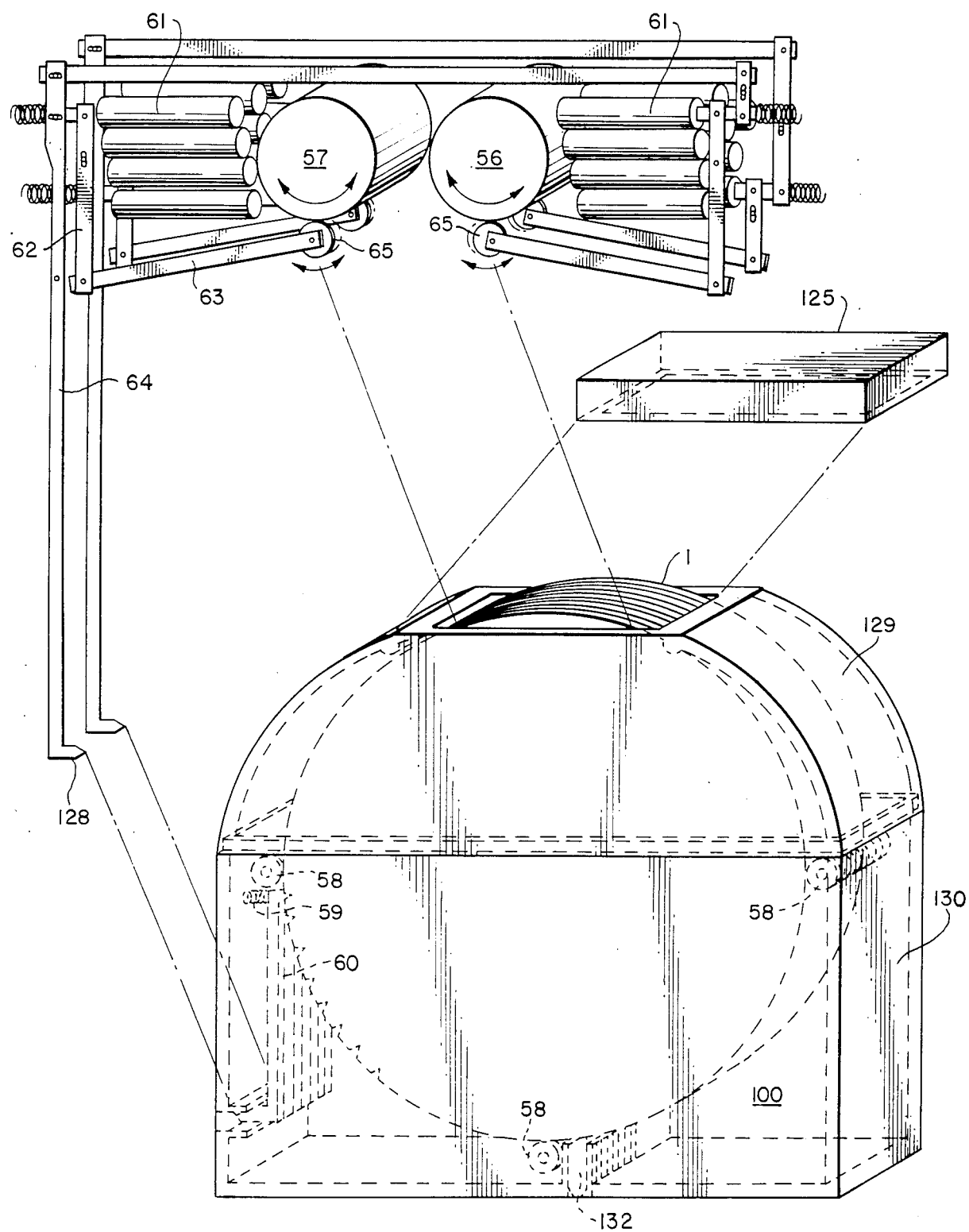

FIG. 4 shows the arrangement introduced into the art by the present invention. It is the only combination which avoids the limitations of center support. For this reason, it is preferred in most applications, except in specialized situations such as that described later and illustrated in FIG. 6. As shown in FIGS. 5 and 8, cartridges 100 (or the chassis) provide a set of grooved perimeter support wheels or bearings 58 for each disc. With the top half 129 of the cartridge removed, discs may readily be dropped into their respective support grooves, much as slides are loaded into the stalls of a slide tray. Each set of support bearings is spatially isolated from its neighbors so that rotation of one disc cannot induce motion in another.

FIG. 5 illustrates a preferred embodiment. As explained above, it is of perimeter support/perimeter drive configuration.

In FIG. 5, a cartridge 100 partially broken away and partially in exploded view is shown. The cartridge, moved from its installed position for the sake of clarity, supports a stack of discs 1 peripherally by means 58. The discs are peripherally driven by means illustrated in FIGS. 5 and 14 and illustrated later by alternative means shown in FIGS. 6, 7 and 8.

As explained in the Summary, the present invention method uses three degrees of motion—x, y and z—to access selected images, and auxiliary motions to maintain constant optical pathlengths. Motions z and x are implemented by the disc/radial selection mechanism, while the remaining motions are considered as part of the optical system.

Figure 14:
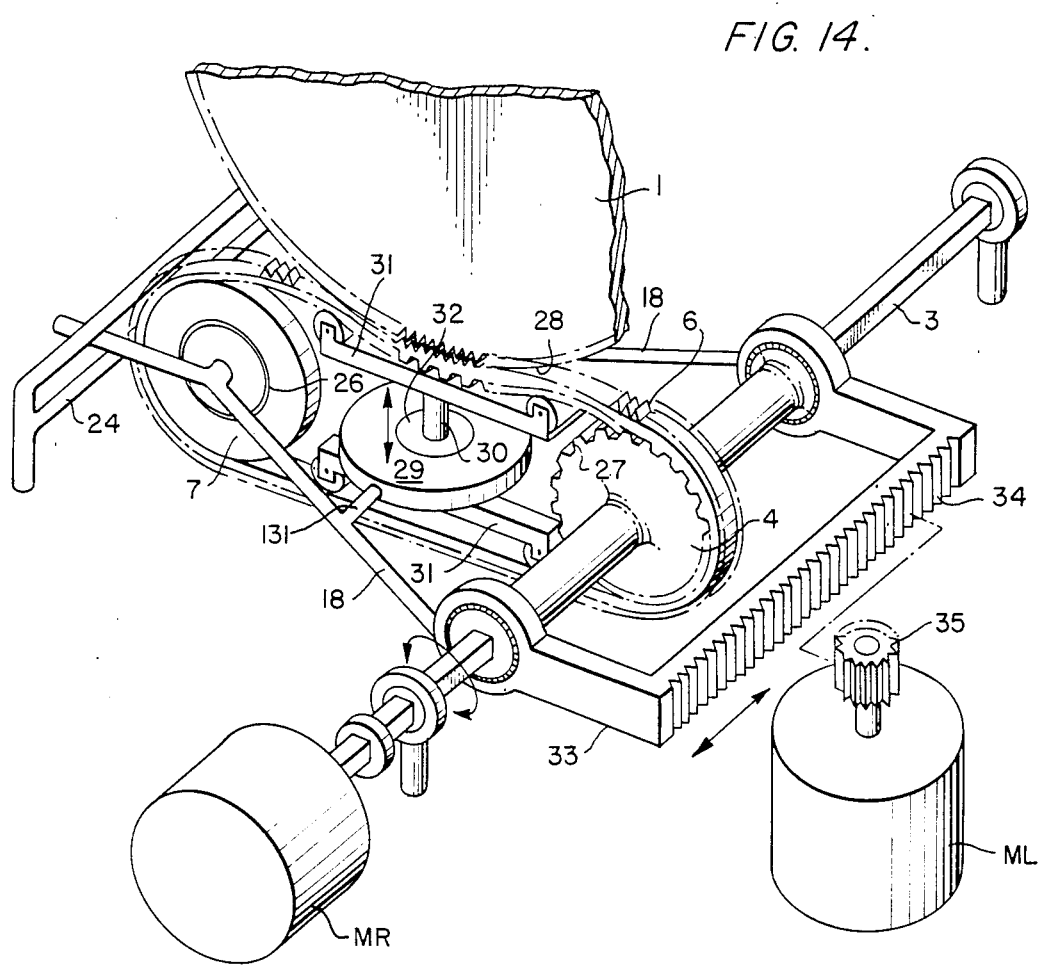
FIG. 14 is a detailed view of a disc/radial selection mechanism.

The structure of the disc/radial selection mechanism in FIG. 5 is set forth in greater detail later in FIG. 14. In brief, the disc/radial selection mechanism is a combination linear/rotational device.

The linear component is comprised of a rack 34 driven by a pinion 35 mounted on the shaft of motor ML and associated support structures. Rotation of the pinion 35 slides the radial position selection component carried by the rack 34 support assembly axially along shaft 3 to a position adjacent the selected disc 1.

The rotational component comprises a drive pulley 4, an idler pulley 7, a belt 6 trained over said pulleys, a motor MR, a clutch mechanism 29 and associated supporting structures. Motor MR rotates the keyed shaft 3 thereby rotating the pulley 4 and driving the belt 6. The clutch mechanism is comprised of a shaft 30 connected to lifting means 32 which is supported from the chassis by means 131. When the means 32 is activated the shaft 30 raises the upper run of the belt into engagement with the periphery of the selected disc 1 and the disc is rotated until the radius carrying the selected data image 9 moves into proper aligned position with the clear windows 11 in the other discs 1.

The optical system, shown in FIGS. 5, 9, 10, 11, 12 and 13 is comprised of an illumination or scanning device 66, lens 67, mirrors 68, paired mirrors 69, level select mirrors 101 and associated support and guide structures.

During the time that the disc/radial selection mechanism is finding and rotating the selected disc, the optical system simultaneously positions and level selection mirrors 101 so that the optical axis is at the correct height to intersect the selected image frame 9. The level selection mirrors 101 are mounted on level selection tables or carriages 102 (only one carriage being illustrated in FIG. 5) for vertical movement whereby the optical axis may be adjusted continuously or incrementally from a position substantially at the center of the discs 1 along a radius to a position substantially at the periphery of the discs by a pulley and cable arrangement driven by motor MO.

As the disc and level positions are moved, undesirable changes take place in the optical pathlengths. These changes are corrected by auxiliary means in the optical system called the pathlength compensation mechanism. The causes and effects of pathlength changes and the solution are described next.

When the level position (optical axis) is moved up by the level selection mirrors 101, the distance between the selected disc image and the lens lengthens, as does the distance between the selected image and the illumination source. When the disc position is moved toward the lens by the disc/radial selection mechanism, the distance between the selected disc image and the lens shortens, while the distance between the selected image and the source lengthens.

The effect of any change in the image-to-lens pathlength is to change the size of the primary aerial image 103 and its distance from the lens. In order to be readily utilized by display or transmission means, the aerial image must be kept constant in position and in size (unless zooming is intended, as indicated by the phanton lens position in FIG. 13).

The effect of any change in the image-to-source pathlength is to change the cross section of the source cone intersecting the accessed frame, effecting the brightness and evenness of illumination.

The pathlength compensation mechanism is designed to keep the primary aerial image constant in size and position, regardless of whether disc and level positions change independently or concurrently.

The pathlength compensation mechanism is quite similar to the disc/radial selection mechanism in that it is a combination linear/rotational device. The linear component is driven and compensates for changes in level selection, while the rotational component is driven and compensates for changes in disc selection.

Figure 12:
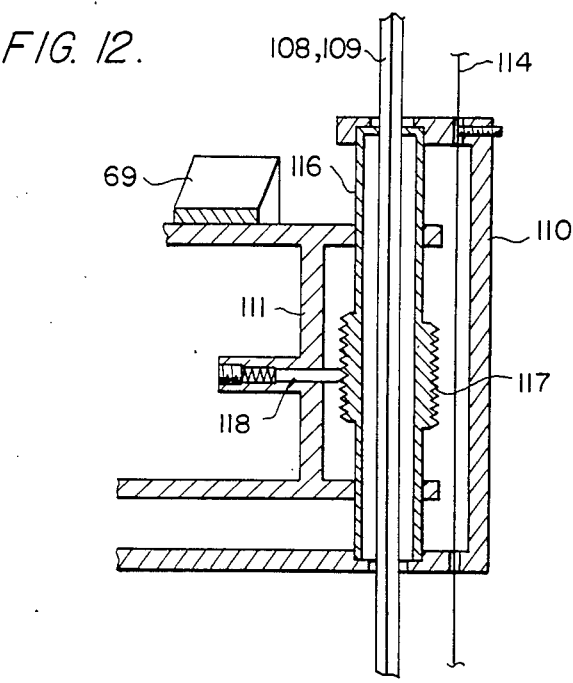
Figure 13:
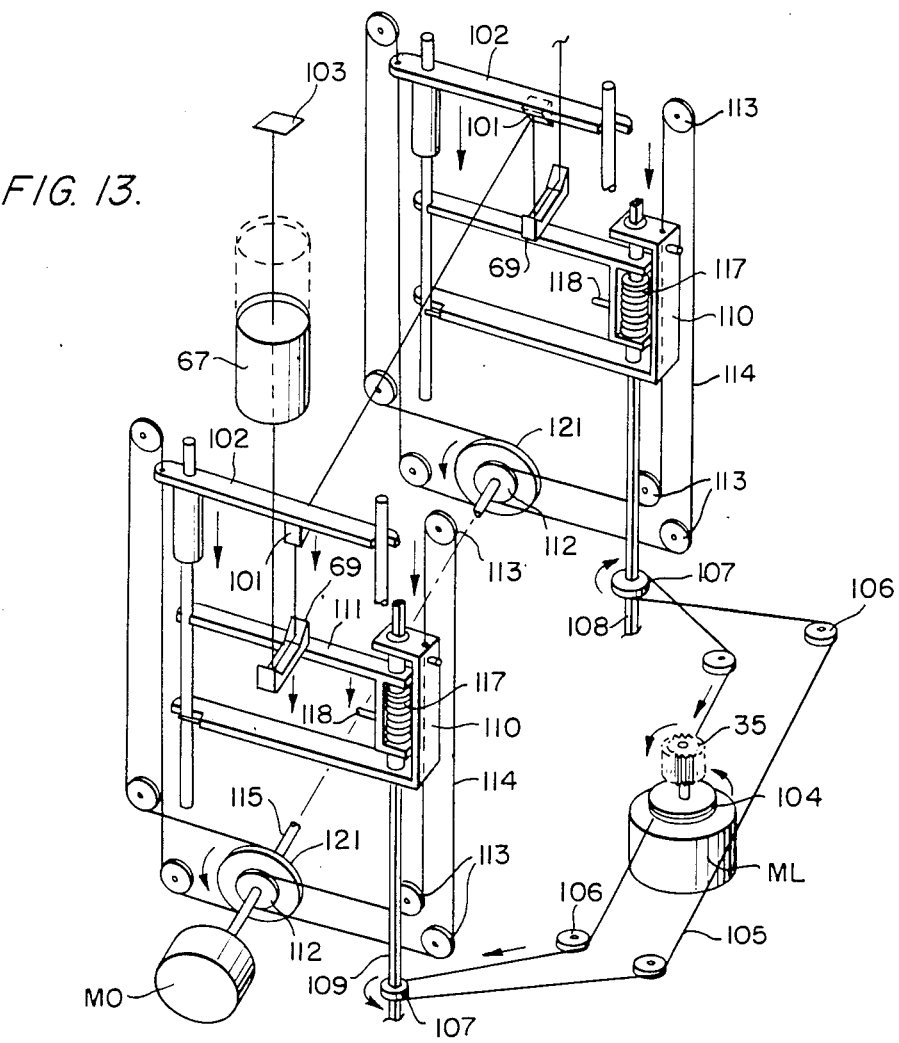

Both the linear disc selection motor ML and the level selection motor of the optical system MO have auxiliary linkages to two identical pathlength compensation linear/rotational devices located at either end of the disc stack, as shown in FIGS. 5 and 13. These linkages actuate the two double bracket assemblies, shown in greater detail in FIGS. 9, 10, 11 and 12.

The outer brackets 110 are the linear components and adjust the pathlength relative to level selection. As the shaft of motor MO rotates the level selection drive pulleys 121, it also rotates the auxiliary pulleys 112, thereby moving the double bracket assemblies in their entirety by means of cables 114 and idler pulleys 113. Referring to FIG. 13 (an expanded view of the compact assembly in FIG. 5), whenever the level selection mirrors descend, the double bracket assemblies slide down shafts 108 and 109, carrying the mirror pairs 69 with them and keeping the optical pathlengths constant. Because the mirror pairs 69 fold the path back on itself, the mirror pairs 69 need travel only half as far as the level selection mirrors 101; the auxiliary pulleys 112 are therefore only half the diameter of the level selection drive pulleys 121.

The inner brackets 111 are the rotational components and adjust the pathlength relative to disc selection. As the disc selection motor ML rotates its drive pinion 35, it also rotates auxiliary pulley 104, which rotates shafts 108 and 109 in opposite directions from one another by means of cables 105, idler pulleys 106 and shaft-mounted pulleys 107. Referring to FIG. 12 the keyed (noncircular in section) rotating shafts 108 and 109 raise and lower the inner brackets 111 relative to the outer brackets 110 by rotating the support tubes 116. As the helically threaded portion of the tubes 117 turn, they carry the engaged detents 118 and the inner brackets 111 axially. Again, because the optical path is folded back on itself by the mirror pairs 69, changes in disc position need be compensated only by half; the pitch of the helixes and the diameters of linkage pulleys are implemented accordingly. Since the total linear travel of the disc/radial selection mechanism is equal to the thickness of the stack, the length of travel of the inner brackets 111 and the length of the helical sections will be equal to half the thickness of the stack.

To recap the actions of the double bracket mechanism, again referring to FIG. 12: Whenever the level position is changed, cables 114 slide the outer brackets 110 axially along keyed shafts 108 and 109, carrying the inner brackets 111 and mirror pairs 69 with them to compensating positions. Whenever the disc position is changed, the keyed shafts 108 and 109 rotate, sliding inner brackets 111 axially along support tubes 116 by means of helixes 117 and detents 118, carrying the mirror pairs 69 to compensating positions. When both level position and disc position are changed simultaneously, the outer and inner brackets move concurrently and independently.

The preferred embodiment just described can be viewed as a "general purpose" device meeting a wide variety of high-speed image retrieval needs.

The following two embodiments provide means for achieving even higher retrieval speeds, by providing more direct access to each disc and by rotating two or more discs at one time.

Figure 6:
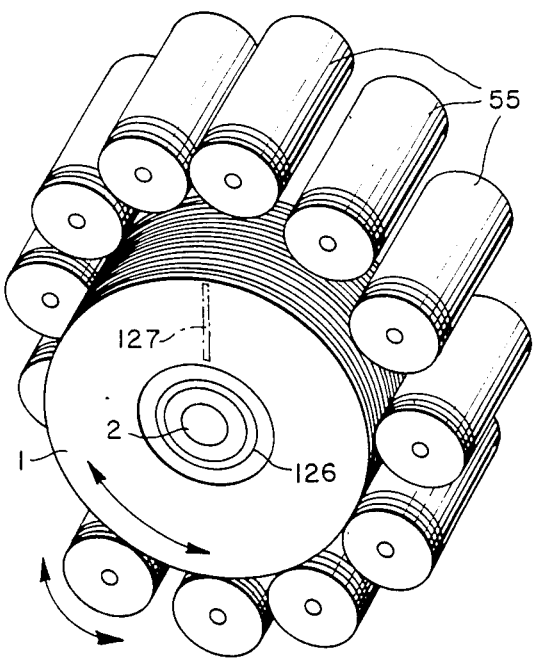
FIG. 6 illustrates a center support/perimeter drive mechanism.

In FIG. 6 a motor per disc combination is disclosed. In this embodiment there is a separate motor 55 provided for each disc 1. The discs are supported for rotation by a shaft 2 and journaled thereto by precision high speed anti-friction bearings 126.

This system provides faster access to any image because actuating a selected motor 55 eliminates the time needed to move a rotational drive from disc to disc, and a disc previously positioned to access a particular frame can simultaneously be rotated to the clear window position.

The window 127 shown in this particular embodiment is very narrow since it must pass only a read/write laser beam in optical data disc applications.

Figure 7:
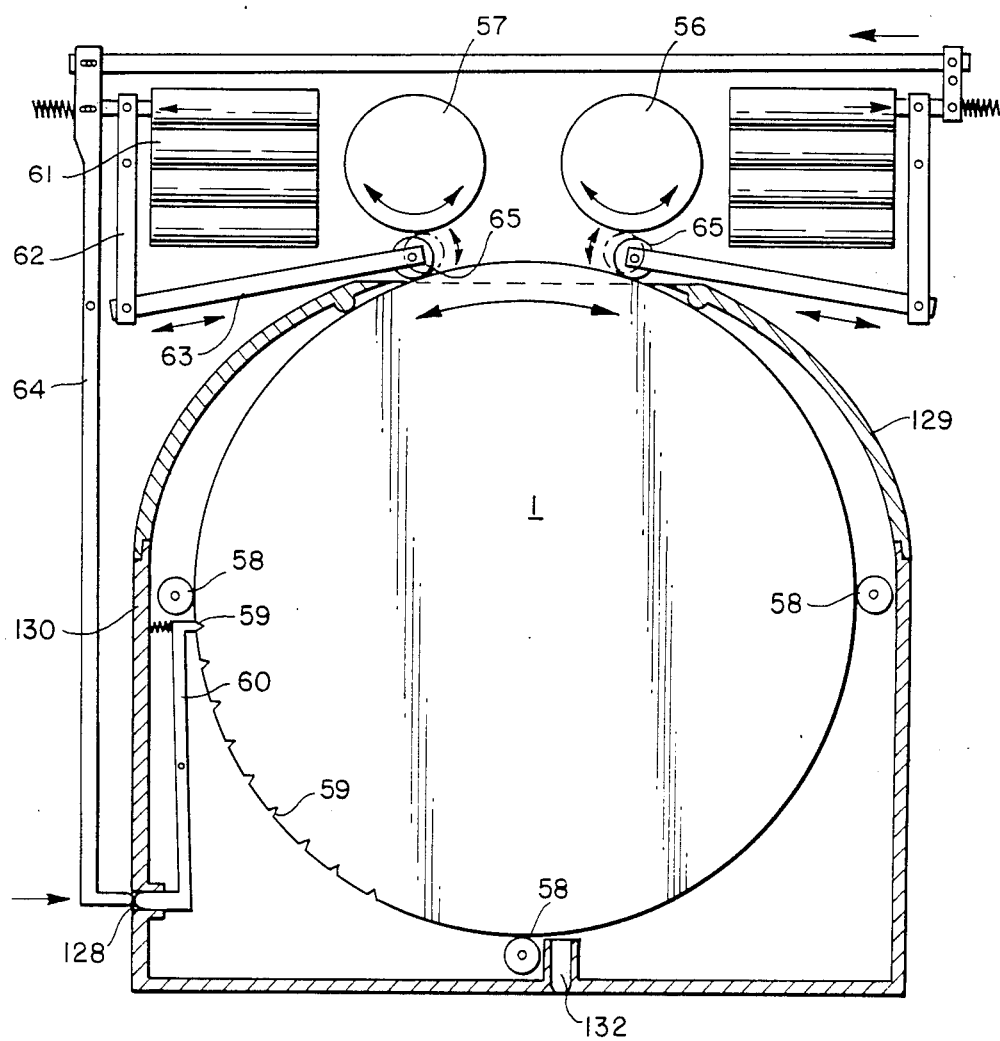
FIGS. 7 and 8 present views of a different embodiment of the perimeter support/perimeter drive combination with a different mode of disc and radial selection.

In FIGS. 7 and 8 two motors 56 and 57 are employed and two solenoid actuated clutch/drive elements 65 are provided for each disc. The discs 1 are individually supported on cartridge rollers 58. Each disc has a notch 59 in its perimeter at each radial position. In the clear window or "home" position, a spring-loaded pivoted detent 60 engages the home notch 59. When a solenoid 61 is energized, the linkages 62, 63 and 64 are pivoted to move a driving roller 65 into contact with the drive roller of motor 57 and a disc 1, and to simultaneously pivot the detent out of the notch in the perimeter of the disc 1. While motor 57 is rotating a disc to a selected radial position, motor 56 and another clutch are activated to rotate the previously selected disc back to its home position. While not as fast as the separate motor system, the disc selection time is very fast, and the finding and filing operations are conducted simultaneously.

A few additional details in FIGS. 7 and 8 are worth notice. First, detent-driving members 64 communicate with detent pivots 60 through the cartridge casing 130 at point 128, enabling cartridges to be removed and replaced. Second, the purpose of the detent notches at each radial position is two-fold: to allow the solenoid clutches to turn off once the selected position has been accessed (the detents keep the discs in place), and to increase positional accuracy by detenting into a self-centering depression. Third, the lift-out pins 132 at the bottom of the cartridge assist in removing discs from the tightly spaced stack. The pins are actuated by mating levers in either the chassis or a separate work station. Fourth, the cartridge lid 125 is removed by the user before inserting the cartridge into the chassis so that the motor drive rollers and clutch rollers have access to the discs. In the preferred embodiment in FIG. 5 the access "lid" is a bottom panel 125.

The disc/radial selection mechanism was explained operationally in the description of the preferred embodiment. FIG. 14 provides an unobstructed view of the mechanism, which is now described structurally in greater detail.

In this embodiment, the bars 24 are fixed and not mounted for movement. Idler pulley 7 is carried by a bearing 26 mounted on the bight of the substantially U-shaped member 18. The drive pulley 4 carries teeth 27 which engage similar teeth on the inner surface of the belt 6; the outer surface of the belt 6 is notched to engage mating teeth 28 on the perimeter of the disc 1. To move the belt into engagement with the teeth 28 and to tension the belt, a clutch means indicated generally at 29 is disposed between the inner runs of belt 6 not engaging the pulleys 4 and 7. The clutch means 29 is comprised of vertical movement apparatus having a shaft 30 mounted for vertical movement.

The upper end of the shaft 30 carries a U-shaped member 31. The upwardly extended portions of the member 31 have rotatably mounted thereon notched pulleys which engage the teeth in the lower surface of the upper run of the belt.

The middle of the shaft 30 is operatively connected to the lifting means 32, which may be a voice coil solenoid, which on its lower portion carries a second U-shaped member 31, which has downwardly extended leg portions which carry similar pulleys engaging the upper surface of the lower run of the belt. The lifting means 32 is supported and maintained in position by legs 131 attached to member 18.

For accomplishing linear motion (disc selection), a U-shaped member 33 attached to and extended in the opposite direction from the member 18 is employed. The bight of the U extending parallel to the axis of the keyed shaft 3 comprises on its outer side a rack 34 which engages pinion 35 carried by motor ML. When the motor ML is activated, the pinion 35 rotates to move the rack and associated structure in the desired direction to position the belt 6 adjacent the selected disc 1.

To accomplish rotational motion (radial selection), the belt raising apparatus 29 is then activated to place the belt in meshing engagement with the teeth of disc 1 and motor MR rotates the belt 6 by means of keyed shaft 3 and drive pulley 4 until the selected image on the disc is in the proper aligned position.

Figure 15:
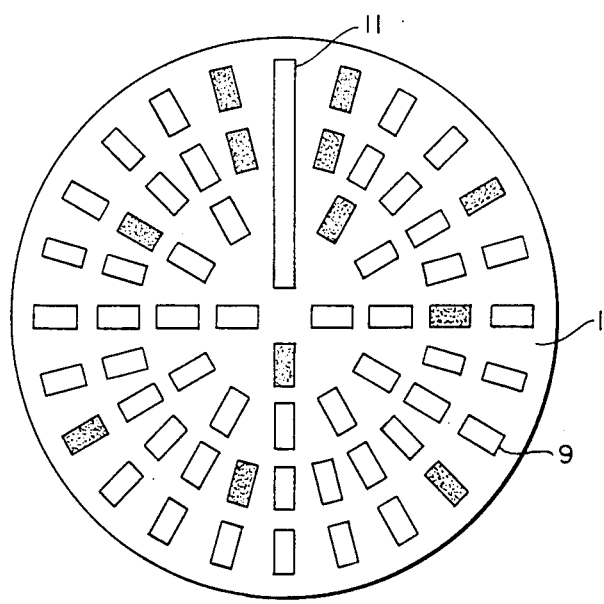
FIG. 15 is a view of a single windowed disc.

FIG. 15 illustrates schematically how the principle formatting of the discs 1 strikes a balance between maximizing the number of images per disc surface and simplifying the mechanism used to retrieve them.

The images 9 are carried in rectangular cells arranged concentrically along the radii of the substantially circular disc.

In microfiche, the rectangular images are stored in a rectangular format which utilizes the space on each individual film card to best advantage to store the largest possible number of images. However, microfiche retrieval devices require each fiche to be moved from a storage position to an active viewing position, thereby increasing the total space needed for retrieval. Also, in the typical fiche arrangement utilizing a single optical axis, the active viewing area (a microfiche reader platen) must be nearly four times the fiche area.

In the disc 1 of the present invention a clear window 11 is provided which when aligned with the clear window of similar discs provides a clear path for the optical axis whereby the selected image may be retrieved. As a result, the find and file operation of the image is accomplished by rotating a selected disc in place whereby no additional retrieval space is required and the stack density may be substantially increased while the time for retrieval is dramatically decreased. Positioning the images on radii of the disc and limiting the number of radial positions the retrieval mechanism must address allows the use of inexpensive stepper motors and open-loop controllers. If the concentration on each concentric ring is increased without regard to discrete radial positions, the expense and sophistication of the radial positioning drive increases without a substantial increase in the number of images stored and the speed of retrieval.

Disclosed herein are the apparatus and process for the rapid access retrieval of micrographic and data images stored on windowed discs. It is pointed out that the apparatus and process simplify access to and reduce the time to "find" a specific image and to return the image bearing disc to a "file" position in a stack of discs. It also provides for ready access to a stack of discs and the substitution of one disc or several discs in the stack as well as the addition or subtraction of a disc or discs in the stack without the necessity of removing the entire stack from the retrieval apparatus.

Since various modifications within the spirit of the invention may occur to those skilled in the art, it is intended that no limitation be placed on the invention except as defined by the scope of the appended claims.

I claim:

1. An apparatus for random access retrieval of micrographic and data images stored along radii of stacked windowed discs, each disc having a closed perimeter and a radially disposed clear window, said apparatus comprising: means for supporting a stack of discs at the perimeter thereof; a selection means for addressing a particular disc carrying desired information while the disc remains in the stack; an optical system comprising projecting means at one end of a stack of discs for projecting a light along an optical axis to an image receiving means at the opposite end of the stack; means for radially moving said optical system thereby moving said optical axis; and means for rotating the disc to a position wherein the selected image is in the optical axis of said system.

2. The combination of claim 1 in which the means for selecting the disc comprises a frame like member, a shaft supporting said member for linear movement and a means for moving said frame along a longitudinal axis of said shaft parallel to an axis passing at right angles to the diameter of a stack of discs.

3. The combination of claim 2 in which the means for rotating the disc comprise rotatable drive means coupled to an apparatus for selectively moving the rotatable means into engagement with a perimeter of a disc said drive means and apparatus being fixed to and moveable with the frame like member.

4. The combination of claim 3 in which the optical system comprises a light source, lens, and a level selection means comprised of mirrors supported by a carriage, said carriage being actuated by means to maintain a constant path length between the image and light source disposed at one end of a stack of discs for movement vertically along a selected radii carrying the desired image, disposed at the opposite end of the stack is a second means comprised of light transmission lens and mirrors, level select means, and compensation means to maintain a constant path length between the disc image and lens, said path length compensation means comprising means for vertical movement in response to the movement of disc and image selection means whereby the path lengths from the selected image to the light source and between the lens and the selected image remain constant.

5. The combination of claim 3 in which the means for moving the optical axis includes a level selection means comprised of two carriages mounted for vertical movement at opposite ends of a stack of discs, each of said carriages bearing lens and mirrors for directing the optical path toward said image receiving means, means for moving said carriages in tandem to the height of a selected data image, whereby the optical axis is directed through the selected data image.

6. An apparatus for random access retrieval of micrographic and data images stored along radii of stacked windowed discs, each disc having a closed perimeter and a radially disposed clear window, said apparatus comprising: means for supporting a stack of discs at the perimeter thereof; a selection means for addressing a particular disc carrying desired information while the disc remains in the stack; an optical system comprising projecting means at one end of a stack of discs for projecting a light along an optical axis to an image receiving means at the opposite end of the stack; means for radially moving said optical system thereby moving said optical axis; and means for engaging and rotating the disc to a position wherein the selected image is in the optical axis of said system; and means for maintaining a constant path length between the selected image and image receiving means.

7. The combination of claim 6 in which the path length compensation means for maintaining a constant optical path length between the selected image and the light source and maintaining a constant path length between the selected image and the image receiving means comprises two identical assemblies disposed at opposite ends of the stack and discs said assemblies each comprising a double-bracket device mounted for movement along a vertical linear axis, means for moving said bracket devices along the vertical axes independent of the movement of disc selection and level selection means.

8. An apparatus for random access retrieval of micrographic and data images stored along radii of stacked windowed discs, each disc having an optically clear window in addition to the data images said apparatus comprising: a selection means for addressing a particular disc carrying information while the disc remains in the stack; means rotatably supporting a stack of discs at their perimeter; an optical system comprising a light projecting means at one end of a stack of discs for projecting a light along an optical axis to an image receiving means at the opposite end of the stack; means for moving said optical system thereby moving said optical axis and means for rotating the disc by contact with the perimeter thereof to a position wherein the selected image is alligned with the optically clear windows of the other discs and the optical axis of said system.

9. The combination of claim 8 in which the means for selecting the disc comprises a frame like member, a shaft supporting said member for linear movement relative to said stack and a means for moving said frame along a longitudinal axis of said shaft parallel to an axis passing at right angles to the diameter of a stack of discs.

10. The combination of claim 9 in which the means for rotating the disc comprises a rotatable drive means coupled to an apparatus for selectively moving into and out of engagement with a perimeter of a disc, said drive means and apparatus being fixed to and moveable with frame like member.

11. The combination of claim 10 in which the optical system comprises a light source, lens and a level selection means comprised of mirrors supported by a carriage, said carriage being actuated by means to maintain a constant path length between the image and light source disposed at one end of the stack of discs for movement vertically along a selected radii carrying the desired image, disposed at the opposite end of the stack in a second means comprised of light transmission lens and mirrors, level select means, and compensation means to maintain a contant path length between the disc image and lens, said path length compensation means comprising means for vertical movement in response to the movement of disc and image selection means whereby the path lengths from the selected image to the light source and between the lens and the selected image remains constant.

12. The combination of claim 10 in which the means for moving the optical axis includes a level selection means comprised of a carriage mounted for vertical movement at each end of a stack of discs, each carriage bearing lens and mirrors for directing the optical path toward said image receiving means, means for moving said carriages in tamden to the height of a selected data image, whereby the optical axis is directed through the selected data image.

13. An apparatus for selecting and rotating a disc in a system for random-access retrieval of micrographic and data images comprising a shaft rotatably carried by spaced brackets on a chassis, means for rotating said shaft in said brackets, a framework slidably mounted on said shaft, means preventing rotation of said framework with said shaft and means for moving said framework longitudinally of said shaft, said framework carrying a drive means, means connecting a portion of said drive means to said shaft for rotation therewith, means selectively engaging said drive means into engagement with the perimeter of a selected disc whereby rotation of a disc places a desired image in a position for alignment with an optical axis.

14. In combination with the apparatus defined in claim 13 a cartridge casing having disc supporting bearing means, a removable portion for inserting a stack of discs into said casing, and a plurality of discs stacked in close proximity supported on said bearing means.

15. The apparatus of claim 13 combined with a substantially circular disc having a continuous perimeter, said disc having a clear window extending along a radius thereof from near to the center to adjacent said perimeter and a plurality of smaller windows adapted to contain micrographic or data images extended at intervals along additional radii thereof.

16. Combination of claim 15 in the disc has notches disposed at spaced intervals around the closed perimeter thereof.

17. An apparatus for selecting and rotating a disc bearing micrographic or data images and a radially disposed clear window from similar discs stacked therewith, comprising a shaft, a means for mounting a stack of discs for rotation relative to said shaft, a plurality of reversible motors, each motor having a drive means mounted for engagement with a disc perimeter, a motor when activated adapted to rotate a single disc to a find position, means for simultaneously activating other motors to rotate other discs to a file position with their clear windows aligned with a selected image in a find position whereby a selected image may be projected by optical means through the aligned clear windows.

18. An apparatus for random access retrieval of micrographic and data images stored on stacked windowed discs said apparatus comprises: drive means, linkage connected to a disc locking means and a linkage connected to a driving element, each disc position having a linkage locking means and driving element, an actuator means for each linkage, said drive means being capable of continuous operation whereby when said actuator means moves said linkage the disc locking means is disengaged and the driving element engages the drive means and disc perimeter to rotate a disc window carrying the desired image into a position to be read; each disc position having a second linkage carrying a second drive element and second drive means capable of continuous operation in a direction independent of the direction of movement of said first drive means, second actuator means for moving said linkage to place the second drive element in contact with the second drive means and the perimeter of a disc to rotate the disc to file position simultaneously with the rotation of a first disc to a find position.

19. In combination with the apparatus defined by claim 18 a cartridge casing having disc supporting bearing means, a removable portion for inserting a stack of discs into said casing, a plurality of discs stacked in close proximity supported on said bearing means the perimeter of each disc having notches spaced thereabout, a wall of said cartridge having an opening disposed adjacent the perimeter of each disc, said locking means comprising a detent selectively extended through a selected opening to engage one of said notches in the perimeter of a selected disc to lock the disc against rotation.

20. A disc for use in a random-access retrival apparatus comprising a substantially circular disc, said disc having a closed perimeter, said disc having a clear window extending along a radius thereof from near the center to adjacent the closed perimeter and a plurality of smaller windows adapted to contain micrographic or data imates extended at intervals along additional radii thereof, said disc being adapted to be rotated by contact of a drive means with said closed perimeter.

21. The disc defined in claim 20 in which there are notches disposed at spaced intervals around the perimeter thereof.

22. The disc defined in claim 20 in which the windows are disposed as follows: a clear window extended substantially the length of a radius and smaller windows disposed on radii in a spaced relation in repeating image sector patterns, each sector beginning with a strip of images extending the same length as the clear window, followed by strips of images of varying lengths, said lengths and the number of sectors being selected to maximize the number of images per disc depending on the diameter of the disc and on the number of radial positions.

23. The disc defined in claim 20 in which the clear window extended radially on the disc is very narrow since it is adapted for use with optical data discs and must pass only a read/write laser beam, and in which data is disposed in concentric tracks.

24. The disc defined in claim 20 in which optically readable codes are placed near the perimeter at each radial position whereby the actual radial positioning of the disc may be monitored by close-loop control means.

25. An optical system for a random access retrieval apparatus comprising an assembly of a light source, reflecting mirrors and lens for directing a light path supported in spaced relation to a second assembly comprised of a lens and an image receiving means, said spaced assemblies each having a light path length compensating means associated therewith whereby the light path length remains constant when a stack of windowed discs are received in the space between the assemblies and the light is projected through the windows.

26. The apparatus of claim 25 in which each pathlength compensating means comprises a level selection mirror and a mirror pair, each level selection mirror being carried by a vertically moveable bracket and each mirror pair being carried by a second moveable bracket, said moveable brackets being moved simultaneously by a means for rotating the discs to select a particular image thereon and the second moveable brackets being moveable by a means to select a specific disc, movement of the level select mirrors being at a rate twice the rate of movement of the paired mirrors thereby maintaining a constant path length.

27. A process of retrieving micrographic and data images stored on stacked windowed discs comprising moving a disc selection means to address a particular disc carrying the desired image, while the disc remains in the stack, projecting a beam of light from a source at one end of the stack to an image receiving means at the opposite end of the stack, moving the light beam along a radius of said stack and rotating the disc until the selected image is projected on an image receiving means.

28. The process of claim 27 wherein the movement of the disc selection means comprises moving a frame like member linearly along a shaft at right angles to the diameter of the stack of discs.

29. The process of claim 28 in which the step of rotating the disc comprises moving a rotating means carried by the disc selection means into engagement with the perimeter of the selected disc.

30. The process of claim 29 including maintaining a constant path length between the image and the light source and maintaining a constant path length between the image and the image receiving means, and moving said path compensation means with the means moving said light beam.

31. A process for random-access retrieval of micrographic and data images comprising rotating a shaft carried by spaced brackets on a chassis, rotating a drive means carried by a framework slidably and non-rotatably mounted on a shaft, moving said framework and drive means longitudinally along said shaft to position said drive means adjacent a selected disc, rotating said disc by said drive means until the selected radius of the disc is in alignment with an optical axis, moving the optical axis whereby it intersects a selected image on said radius.

32. A process for random-access retrieval of micrographic and data images within a stack of similar discs comprising, mounting a stack of discs on a shaft for rotation relative thereto, engaging separate reversible driving means with the perimeter of each disc, rotating the selected disc by actuating one of said driving means into a fixed position whereby a selected image may be projected and simultaneously rotating the other discs in the stack to a file position whereby clear windows in the other discs are aligned with the selected image.

33. A process of retrieving micrographic and data images stored in stacked windowed discs wherein there are first drive means, linkage connected to a disc locking means and a linkage connected to a driving element, a driving element and locking means being provided for each disc, comprising operating said drive means continuously, moving said disc locking means to a disengaged position, engaging the driving element with the drive means and disc perimeter to rotate a disc window into a find position to be read, operating second drive means continuously in a direction independent of said first drive means, moving second linkage means to place a second drive element in contact with the perimeter of a disc and moving said discs to a file position.

34. The process of claim 33 including moving a cover and inserting said stack of discs into a casing, supporting said stack of disc on bearings, extending a detent on said locking means into engagement with a notch on the perimeter of a disc.

* * * * *